Patented July 23, 1946

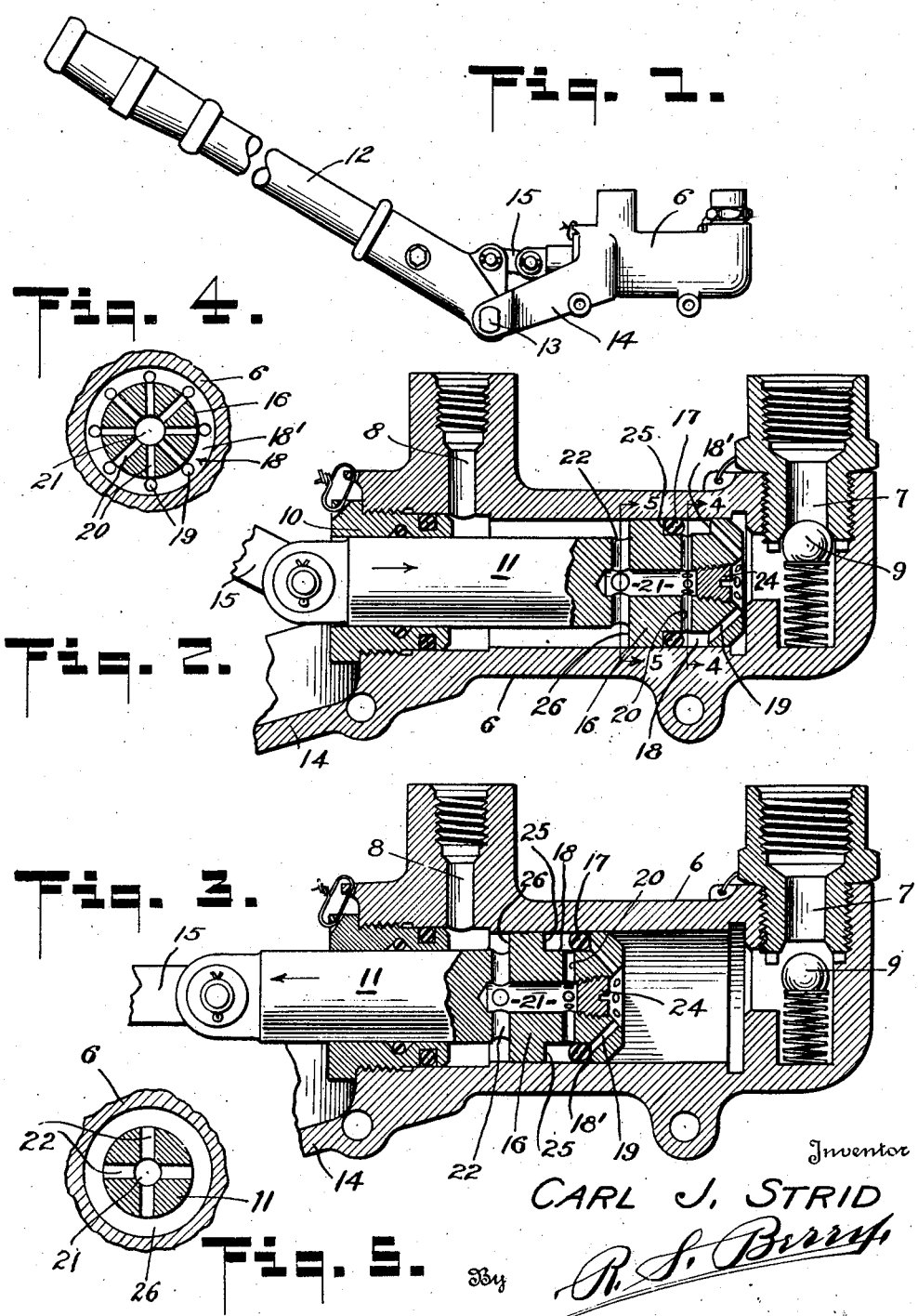

2,404,547

UNITED STATES PATENT OFFICE 2,404,547

HYDRAULIC PUMP

Carl J. Strid, La Canada, Calif., assignor to Adel Precision Products Corp., a corporation of California Application March 6, 1945, Serial No. 581,209

8 Claims. (Cl. 103—178)

This invention relates to auxiliary hand pumps as used in hydraulic systems, particularly in aircraft, for operating such systems in case of failure of the main pump or when the latter is shut off.

An object of this invention is to provide a hand pump of the character described which has a novel and advantageous piston-valve construction by means of which the number of parts is greatly reduced, the construction is appreciably simplified, the cost of manufacture reduced and the operation of assembling, disassembling and servicing the pump rendered extremely simple and subject to being readily and easily carried out.

Another object of this invention is to provide a piston-valve arrangement in which a simple donut type sealing ring or rubber, synthetic rubber or the like serves as a check valve as well as an efficient seal between the piston and cylinder wall.

Yet another object is to provide a novel and efficient piston-valve through the simple expediency of enlarging the sealing ring groove in the piston and forming ports through the piston head in an arrangement such that on one stroke, the sealing ring will move to a position opening the ports for passing fluid through the piston and on the other stroke will move to a position closing said ports to the flow of fluid through the piston; this piston-sealing ring valve arrangement making it unnecessary to use the customary separate check valve assembly in the piston and reducing weight, number of parts and production costs compared to pumps of this class as heretofore made, while also maintaining the desired seal between the piston and cylinder.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a pump embodying my invention;

Fig. 2 is an enlarged fragmentary longitudinal sectional view of the pump showing the piston and sealing ring valve action during one stroke of the piston assembly;

Fig. 3 is a view similar to Fig. 2 showing the valve action on the other stroke of the piston assembly;

Fig. 4 is a fragmentary sectional view taken on the line 4—4 of Fig. 2;

Fig. 5 is a fragmentary sectional view taken on the line 5—5 of Fig. 2.

As shown in detail in the accompanying drawing, my invention is embodied in a pump which includes a cylinder 6 having an intake port 7, a discharge port 8 and a check valve 9 controlling the intake port in the usual manner.

Slidable through a stuffing box 10 within the cylinder is a piston rod 11 which is reciprocated by means of a lever 12 fulcrumed as at 13 on a bracket 14 on the cylinder, there being a link 15 connecting the lever with said rod.

As here shown a piston head 16 is formed integral with the rod 11 and has a working fit in the cylinder, although this head, as is obvious, could be a separate part if desired.

In accordance with my invention a sealing ring 17 on the piston 16 made of synthetic rubber or the like, serves as a valve, the piston being constructed and arranged to provide for limited movement of this ring relative to the piston head as well as to provide a fluid passage through the head, which passage is controlled by the check valve action of the sealing ring responsive to reciprocation of the piston assembly. This makes it unnecessary to use the customary separate check valve assembly in the piston and eliminates parts, weight and production and upkeep costs compared to pumps as heretofore made.

In carrying out my invention the piston head 16 is provided with an enlarged sealing ring groove 18 having a width (extent axially of the piston head) considerably greater than the sectional width or diameter of the sealing ring 17 which is preferably of circular cross section. This makes it possible for the ring to act as a valve to control the flow of fluid through the piston head, inasmuch as the pressure of the fluid plus the frictional resistance of the sealing ring against the cylinder wall causes the ring to shift bodily responsive to reciprocation of the head.

The passage for fluid through the piston head includes a plurality of diagonal ports 19 extending from the outer end of the head into the groove 18 so that in one position the sealing ring 17 will close the ends of these ports which ends open through the side wall 18' of the groove. Fig. 3 shows how the ring 17 is forced against and closes the ports 19, being held in such position by the pressure of the fluid as the piston assembly is moved in the direction of the arrow shown in Fig. 3. The rest of the fluid passage through the piston head is provided for by means of radial ports 20 extending from the bottom of the groove 8 into an axial bore 21 in the center of the head and by a second set of radial ports 22 leading from the bore 21 to the periphery of the piston rod 11 at a point adjacent the rear face of the piston head. With this arrangement of the ports 19, ring groove 18, radial ports 20, axial bore 21 and radial ports 22, a by-pass passage is provided in a most economical manner through the piston head, subject to control by the sealing ring 17 while the latter maintains a most effective seal between the piston and the wall of the cylinder 6. A suitable plug 24 closes the outer end of the axial bore 21.

When the piston assembly is moved in the direction of the arrow in Fig. 2, that is, toward the intake port 7, the check valve 9 prevents discharge through said port and the pressure of the fluid against the ring 17 plus the frictional resistance of the cylinder against said ring causes the ring to shift to the left so as to abut and lie against the side wall 25 of the ring groove 18, thereby providing an open by-pass passage through ports 19, ring groove 18, radial ports 20, bore 21 and ports 22 so that fluid will flow past the piston while the ring 17 maintains an effective seal between the piston head and the cylinder.

As shown in Fig. 3, when the piston assembly is moved in the direction of the arrow, that is, toward the discharge port 8, the pressure of the fluid against the ring 17 causes it to shift against the side wall 18' so as to close the ports 19 and prevent flow of fluid through the by-pass passage in the piston head. This causes the check valve 9 to open and fluid to be drawn into the cylinder through port 7 while fluid is discharged through port 8. Rearward movement of the piston is limited by means of a stop shoulder 26 on the rear face of the piston head.

It is now apparent that in making the ring groove of greater width than usual and in forming a by-pass passage through the piston head intersected by the groove so that the sealing ring will shift into and out of positions for opening and closing the passage, I have provided a most efficient combined valve and seal which makes it unnecessary to use the separate sealing ring and the separate check valve heretofore required. This piston-valve-sealing ring-unit, while here shown in a pump, may, however, be used in any other device or mechanism where a piston or like member is employed and it is desired to control the flow of fluid through a passage therein in accordance with this invention.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a piston valve-sealing ring unit, a cylinder, a reciprocal piston head in said cylinder having a fluid by-pass passage extending therethrough and a sealing ring groove therein intersecting and forming a part of said passage, and a sealing ring mounted in said groove and positioned and dimensioned to have a constant sealing contact both with the head and with said cylinder, said ring and groove being dimensioned so that the ring will shift into and out of positions for opening and closing said passage upon reciprocation of said head while maintaining a seal between the piston head and the cylinder or bore wall associated with the head.

2. In a piston valve-sealing ring unit, a cylinder, a reciprocal piston head in said cylinder having a fluid by-pass passage extending therethrough and an elastic sealing ring groove therein intersecting and forming a part of said passage, and a sealing ring mounted in said groove and positioned and dimensioned to have a constant sealing contact both with the head and with said cylinder, said ring and groove being dimensioned so that the ring will shift into and out of positions for opening and closing said passage upon reciprocation of said head while maintaining a seal between the piston head and the cylinder or bore wall associated with the head.

3. In a piston valve-sealing ring unit, a cylinder, a reciprocal piston head in said cylinder having a fluid by-pass passage extending therethrough and a sealing ring groove therein intersecting and forming a part of said passage, and a sealing ring mounted in said groove and positioned and dimensioned to have a constant sealing contact both with the head and with said cylinder, said ring and groove being dimensioned so that the ring will shift into and out of positions for opening and closing said passage upon reciprocation of said head while maintaining a seal between the piston head and the cylinder or bore wall associated with the head, said ring being normally of substantially circular cross section.

4. In a piston-valve-sealing ring unit, a piston head having a circumferential sealing ring groove therein, ports extending from one end face of the head so as to open through one side wall of said groove into the latter, said head having an axial bore closed at its ends, ports extending from the bottom of the groove into said bore and other ports extending from said bore so as to complete a fluid by-pass passageway through said head, and a sealing ring in said groove, said groove and seal being dimensioned so that the ring will shift in the groove into positions for opening and closing certain of said ports to open and close said by-pass passageway through said head upon reciprocation of said piston head.

5. In a piston-valve-sealing ring unit, a cylinder, a piston head in said cylinder having a circumferential sealing ring groove therein, ports extending from one end face of the head so as to open through one side wall of said groove into the latter, said head having an axial bore closed at its ends, ports extending from the bottom of the groove into said bore and other ports extending from said bore so as to complete a fluid by-pass passageway through said head, and a sealing ring in said groove for effecting a seal between the head and the wall of said cylinder, said groove and seal being dimensioned so that the ring will shift in the groove into positions for opening and closing the first named ports whereby said passageway is open and closed to passage of fluid therethrough upon reciprocation of the head.

6. In a pump, a cylinder having an intake port and a discharge port, a check valve controlling said intake port, a piston rod in said cylinder, means for reciprocating said rod, a piston head on said rod reciprocable in said cylinder and having a sealing ring groove extending circumferentially thereof, and a by-pass passageway which intersects said groove so that a part of the groove forms a part of the passageway, and a sealing ring mounted in said groove to shift axially of the head responsive to reciprocation of the head and to assume positions for opening and closing said passageway to the passage of fluid through said head, said ring at all times being in sealing contact with said cylinder and piston head to prevent leakage therebetween.

7. In a pump, a cylinder having an intake port and a discharge port, a check valve controlling said intake port, a piston rod in said cylinder, means for reciprocating said rod, a piston head on said rod reciprocable in said cylinder and having a sealing ring groove extending circumferentially thereof, a port extending from the outer end of the head and opening through one side wall of said groove, and a sealing ring mounted in said groove so as to move axially of the head into and out of position closing the first named port responsive to reciprocation of said head, said head having a passage therein leading from the bottom of said groove, through said head and rod to a point on the exterior of the rod rearwardly of said head.

8. In a piston-valve-sealing ring unit, a cylinder, a piston reciprocable in said cylinder and having a head provided with a circumferential sealing ring groove therein and ports extending from one end face of the head so as to open through one side wall of said groove into the latter, said head having a bore passing axially therethrough and terminating in the rod portion of the piston, a plug closing the outer end of said bore, ports extending from the bottom of the groove into said bore and other ports extending from said bore so as to complete a fluid by-pass passageway through said head, and a sealing ring in said groove for effecting a seal between the head and the wall of the cylinder surrounding said head, said groove and seal being dimensioned so that the ring will shift in the groove into positions for opening and closing certain of said ports to open and close said by-pass passageway through said head upon reciprocation of said piston head.

CARL J. STRID.